United States Patent [19]

Kawahira et al.

[11] Patent Number: 4,724,502
[45] Date of Patent: Feb. 9, 1988

[54] POWER TRANSMISSION SYSTEM WITH CURRENT LIMITING DEVICES

[75] Inventors: Hiroyoshi Kawahira; Tsuruo Yorozuya, both of Chofu; Yasuhide Shinozaki; Kazuhiro Yokouchi, both of Amagasaki; Hiroshi Suzuki, Tokyo, all of Japan

[73] Assignee: Mitsubishi Denki Kabushiki Kaisha, Japan

[21] Appl. No.: 680,090

[22] Filed: Dec. 10, 1984

[30] Foreign Application Priority Data

Dec. 16, 1983 [JP] Japan ................. 58-237618

[51] Int. Cl.[4] ............................................. H02H 7/04
[52] U.S. Cl. ......................................... 361/62; 307/19; 307/38
[58] Field of Search ............... 307/19, 38, 80; 361/63, 361/62

[56] References Cited

U.S. PATENT DOCUMENTS

| 726,837 | 5/1903 | Andrews | 361/63 |
|---|---|---|---|
| 751,395 | 2/1904 | Wilson | 361/63 |
| 848,982 | 4/1907 | Fjare | 361/63 |
| 2,100,498 | 11/1937 | White | 307/38 X |
| 2,861,222 | 12/1958 | Hodtum | 361/63 |
| 2,993,148 | 7/1961 | Pywell | 361/63 |
| 3,070,732 | 12/1962 | Crandall et al. | 307/38 |
| 3,315,129 | 4/1967 | Fisher | 361/63 X |
| 4,354,215 | 10/1982 | Van der Scheer | 361/63 |
| 4,539,487 | 9/1985 | Ishii | 307/19 X |
| 4,577,253 | 3/1986 | Blahous et al. | 307/19 X |

FOREIGN PATENT DOCUMENTS

| 140648 | 3/1980 | German Democratic Rep. ... | 307/38 |
| 43955 | 4/1977 | Japan | 307/38 |

OTHER PUBLICATIONS

"Self-Rehealing Performance Of The P.P.F. For A Control Center", Wada et al., International Conference on Electric Fuses and Their Applications, Liverpool Polytechnic, England, Apr. 7-9, 1976.

Primary Examiner—Philip H. Leung
Assistant Examiner—A. Jonathan Wysocki
Attorney, Agent, or Firm—Leydig, Voit & Mayer

[57] ABSTRACT

A power transmission system with current-limiting devices having a plurality of power transmission stations for transmitting power from a power-receiving line to respective loads wherein each current-limiting device includes a series circuit constructed of current-limiting elements and a bypass switch connected in parallel thereto. The terminals at one end of the limiting devices are connected to corresponding buses of the transmission stations while the terminals at the other end are connected to each other.

3 Claims, 2 Drawing Figures

POWER TRANSMISSION SYSTEM WITH CURRENT LIMITING DEVICES

BACKGROUND OF THE INVENTION

This invention relates to a power transmission system adapted to suppress a shortcircuit current.

A conventional power transmission system is shown in FIG. 1. In the figure, numerals 1 to 3 designate transformers, the primary sides of which are respectively connected through switches 4 to 6 to a power receiving line 7 normally in a 70-150 KV range. Numerals 8 to 10 designate main circuit breakers respectively connected to the secondary side of the transformers 1 to 3, numerals 11 to 13 buses (12.5 KV) respectively connected to the switches 8 to 10, and numerals 14 to 16 power supplying circuits respectively connected to the buses 11 to 13. The power supplying circuits are constructed of a plurality of branch circuits which respectively have circuit breakers 14a, 14b, 14c, and 14d; 15c, 15b, 15c, and 15d; and 16a, 16b, 16c, and 16d. The numerals 4, 1, 8, 11, and 14 form a first power transmission station 17, the numerals 5, 2, 9, 12, and 15 form a second power transmission station 18, and the numerals 6, 3, 10, 13, and 16 form a third power transmission station 19. Numeral 20 to 22 indicate series circuits which respectively have self-recovery type current limiting elements 23 to 25 and switches 26 to 28, wherein the one ends thereof are respectively connected to the buses 11 to 13, and the other ends thereof are respectively connected to each other. Numerals 29 to 31 denote resistors respectively connected in parallel with the current limiting elements 23 to 25 and numerals 32 to 34 denote current transformers for respectively detecting the currents of the resistors 29 to 31 and for respectively transmitting trip signals to the switches 26 to 28.

The operation of the conventional power transmission system will now be described. In FIG. 1, when the power transmission stations 17 to 19 are in normal state, the switches 4 to 6, 8 to 10, and 26 to 28 are all closed, and the power is transmitted through the respective branch circuits. Note that only the unbalanced components of load current between the respective power transmission stations 17 to 19 flow through the circuits of the switches 26 to 28.

If a shortcircuit occurs, for example, at a point A of the power supplying circuit 14 in the above-described state, the shortcircuit current i tends to flow from the respective power transmission stations 17 to 19 toward the point A through the circuits 17-14d-A, 18-21-20-14d-A and 19-22-20-14d-A. However, the shortcircuit currents i from the second and third stations 18 and 19 are respectively limited by the current limiting elements 24 and 25.

The currents flowing through the resistors 30 and 31 which are affected by the current limiting elements 24 and 25 are respectively detected by the current transformers 33 and 34. These current transformers, in turn, generate trip signals to open the switches 27 and 28. Further, the shortcircuit current i from the transformer 1 of the first power transmitting station 17 is removed by the circuit breaker 14d in the power supplying circuit 14. The self-recovery type current limiting elements 24 and 25 are recovered immediately after the switches 27 and 28 are opened. Then, when the switches 27 and 28 are closed by a command from a controller (not shown), it is completely returned to the original state.

When the first power transmission station 17 is in transmitting state and the switches 4 and 8 are operated to interrupt the operation of the transformer 1, the, load current flowing through the power supplying circuit 14 is supplied from the second and third power transmission systems 18 and 19 through the current limiting elements 24 and 25.

In such a case, the power supplied from the second and third power transmission stations 18 and 19 is generally limited to ½ or less of their normal capacities. Then, the power supplied from the second and third power transmission stations 18 and 19 to the power supplying circuit 14 is maintained at a limit of the rated current for the power supplying circuit 14 (e.g., 2000 A). On the other hand, in order to utilize full capacities of the second and third power transmission stations 18 and 19, a current limiting element 23 with a higher rated current (larger capacity) must necessarily be employed.

As described above, since the rated currents (normal capacities) of the power supplying circuits are desired, the current limiting elements require large capacity as a result. This will contribute a disadvantage to the overall power transmission system.

SUMMARY OF THE INVENTION

This invention has been made in order to eliminate the disadvantage mentioned above, and has for its object to provide a power transmission system wherein a second switch which is selectively opened is connected to both terminals of a series circuit having a current limiting element and a first switch. Thus, a load current to a power supplying circuit of a power transmission system in which the operation of a transformer is interrupted flows through the second switch. Therefore, since the current limiting element may flow only a current corresponding to the power to be supplied, the capacity of the current limiting element can be advantageously reduced.

BRIEF DESCRIPTION OF THE DRAWINGS

In the drawings, the same symbols indicate the same or corresponding parts.

DESCRIPTION OF THE PREFERRED EMBODIMENT

Figure 1:
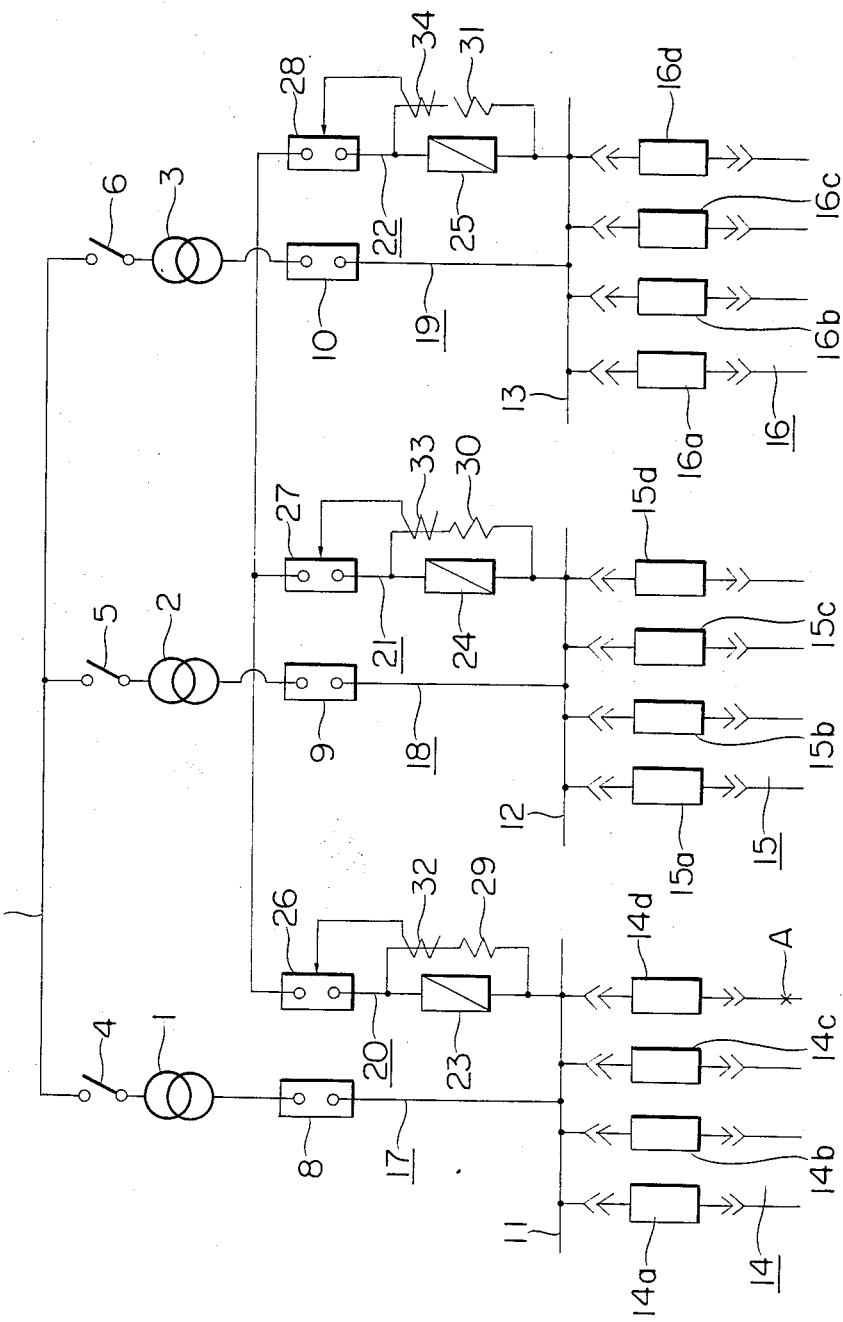
FIG. 1 is a diagram showing the construction of a conventional power transmission system.
Figure 2:
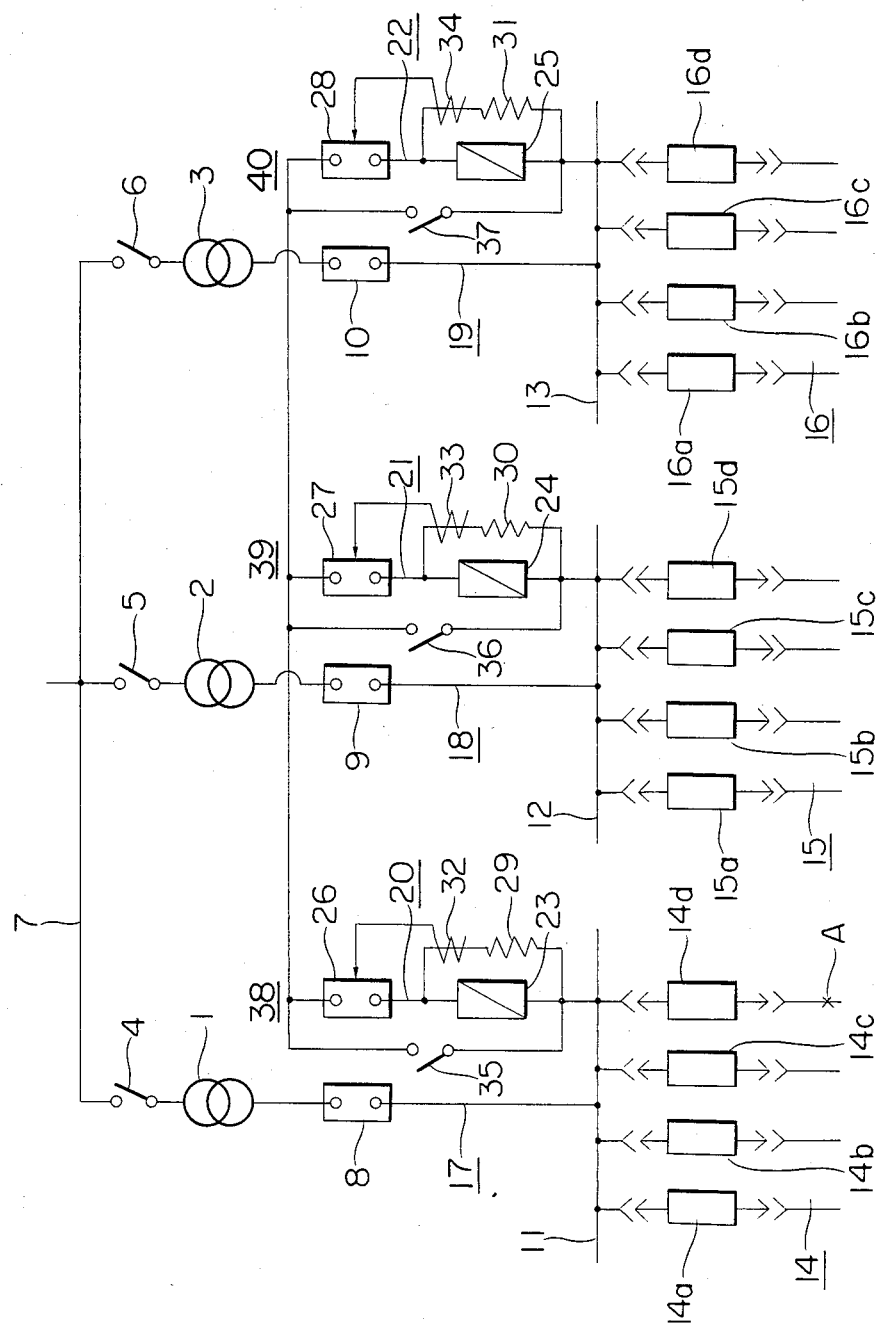
FIG. 2 is a constructional diagram showing a power transmission system according to an embodiment of this invention.

FIG. 2 shows an embodiment of the power transmission system according to the present invention. As can be seen this power transmission system is different from the conventional system shown in FIG. 1 in switching means herein shown as that switches 35 to 37 are provided in parallel with both terminals of series circuits 20 to 22 to form protecting circuits 38, 39, and 40.

According to an aspect of the invention, under normal operation, switches 35 to 37 are opened, and the other elements of the system are operated under the same conditions as in the conventional power transmission system. Even if a shortcircuit occurs at a point A of the power supplying circuit 14, the power supplying circuit is processed in the same manner as the conventional power supplying circuit (the shortcircuit current is 12.5 KV).

When the first power transmission station 17 is in a transmitting state and the operation of the transformer 1 is interrupted, the switch 26 is opened to close the switch 35. Thus, assuming that the rated current of the systems of the ordinary state is 1000 A, a load current of the power supplying circuit 14, the load current of the power supplying circuit 14 is shared by secodn and third power transmission stations 18 and 19, and supplied through the switch 35 to the power supplying circuit 14. For example, 500 A of the load current is flowed from the second station, and 500 A of the load current is flowed from the third station, totally to 1000 A of the load current is supplied in the circuits of 18-21-35-14 and 19-22-35-14. Therefore, the current limiting elements 24 and 25 may have only the capacity of the load currents shared by the second and third power transmission stations 18 and 19.

In the embodiment described above, the condition that only the switch 35 is closed when the operation of the transformer 1 of the first power transmission station 17 is interrupted has been described. When a shortcircuit occurs at the point A of the power supplying circuit 14, the current is limited by the current limiting elements 24 and 25 so that the switches 27 and 28 are opened, with the result that the power supplying circuit 14 is all interrupted.

Then, when it is constructed that any of the switches 36 and 37 is closed, power can be supplied to the power supplying circuit 14 from any of the second and third power transmission stations 18 and 19, and the power interruption of all the system can be accordingly prevented.

For example, in case that a shortcircuit occurs at the point A when it is constructed that the power transmission system is constructed to operated by stopping the transformer 1 and closing the switches 35 and 36, the shortcircuit current flowing from the transformer 3 to the stations 19 to 22 is limited by the current limiting element 25, and the switch 28 is opened. Therefore, only the shortcircuit current flowing from the transformer 2 to the circuits of 18-36-35-14d-A is flowed to the power supplying circuit 14, and the current can be sufficiently broken by the circuit breaker 14d.

According to this invention as described above, the current limiting element has only a capacity capable of flowing the load current to be supplied to the other power transmission station by connecting the second switch which is selectively opened or closed to both terminals of the series circuit having the current limiting element and the first switch, and the capacity of the current limiting element can be consequently reduced.

What is claimed is:

1. A transmission system including a plurality of power transmission stations transmitting power from a power-receiving line to a plurality of buses and having current-limiting means limiting overcurrent, each of said stations including:
   (i) means including a first switch, a transformer, and a circuit breaker providing a power station supply circuit connecting an associated bus to receive power from the power-receiving line;
   (ii) power-supplying circuits providing a plurality of branch circuits, each having a circuit breaker connected to a respective load from the associated bus;
   (iii) protecting means connected at one end to the associated bus and having another end connected to corresponding ends of protecting means of other stations, said protecting means of each station having a current-limiting device for limiting current flow through said protecting means; and
   (iv) switching means connected in parallel with said protecting means, said switching means of any one of the stations being selectively operable, in the event of operation of the first switch of the same station supply circuit, to bypass the protecting means of the same station and provide a current path for supplying power from the other stations to the associated bus of the one of the stations and all the branch circuits connected thereto.

2. A power transmission system according to claim 1 wherein the first switches are connected at the primary of the transformers and the circuit breakers are connected at the secondary side thereof, each of said current-limiting devices including a resistor connected in parallel to a self-recovery type current-limiting element and a current transformer connected to a limiting circuit breaker for detecting current flowing through said limiting element so as to selectively activate said limiting circuit breaker.

3. A power transmission system according to claim 2 wherein, when said first switch and circuit breaker at one station are opened to interrupt the power transmission through said one station, said switching means of said one station is closed to provide a current path to the associated bus from the other stations, whereas at least at one of the other stations the first switches are closed and the switching means are opened to maintain respective limiting circuit breakers in operation during supply of current through the current path to the associated bus of the one station.

* * * * *